United States Patent

[11] 3,604,975

| [72] | Inventors | Masaru Suzuki<br>Hekikaigun;<br>Tatsushi Kubota, Gifu, both of, Japan |
|---|---|---|
| [21] | Appl. No. | 819,363 |
| [22] | Filed | Apr. 25, 1969 |
| [45] | Patented | Sept. 14, 1971 |
| [73] | Assignee | Kabushiki Kaisha Tokai Rika Denki Seisakusho<br>Nishibiwajima-cho, Nishikasugai, Aichi, Japan |
| [32] | Priority | Apr. 29, 1968 |
| [33] | | Japan |
| [31] | | 43/35024 |

[54] VEHICLE LIGHT CONTROL SYSTEM
6 Claims, 7 Drawing Figs.

[52] U.S. Cl. ................................................. 315/83,
200/1 R, 200/6 C, 200/61.27, 200/61.54, 307/10,
315/322
[51] Int. Cl. ..................................................... B60q 1/46,
H01h 21/18
[50] Field of Search............................................
322; 200/1 A, 1 TK, 4, 5, 6, 15, 61.27, 61.54,
153.7, 153.8, 153.9, 164 A; 340/81; 307/10

[56] References Cited
UNITED STATES PATENTS

| 2,229,981 | 1/1941 | Mann | 200/6 |
| 2,485,818 | 10/1949 | Dorjee | 200/1 X |
| 2,605,338 | 7/1952 | Miller et al. | 200/6 X |
| 2,796,483 | 6/1957 | Wols | 200/61.54 |
| 2,869,033 | 1/1959 | Cheresko | 315/83 |
| 3,135,893 | 6/1964 | Fetzer et al. | 315/83 |
| 3,139,555 | 6/1964 | Paule et al. | 315/82 |
| 3,325,681 | 6/1967 | Swensen | 315/83 |

Primary Examiner—Roy Lake
Assistant Examiner—E. R. La Roche
Attorney—Woodhams, Blanchard and Flynn ABSTRACT: A combined switch device of dimmer and flasher comprising a first, second and third movable conductive elements arranged horizontally or vertically in parallel with and at a spacing from each other, all of said movable conductive elements serving as a dimmer switch as well as a flash switch in association with an operating member movable upwardly or downwardly from its neutral position, and having as a whole a comparatively flatter shape.

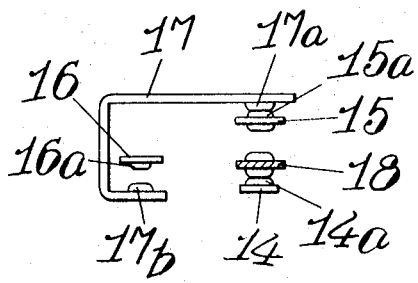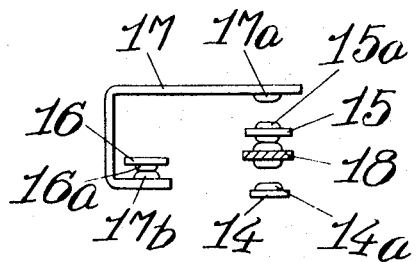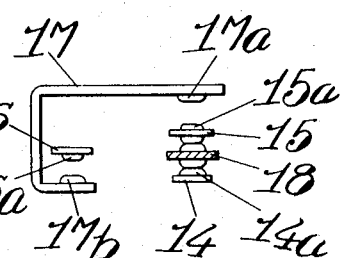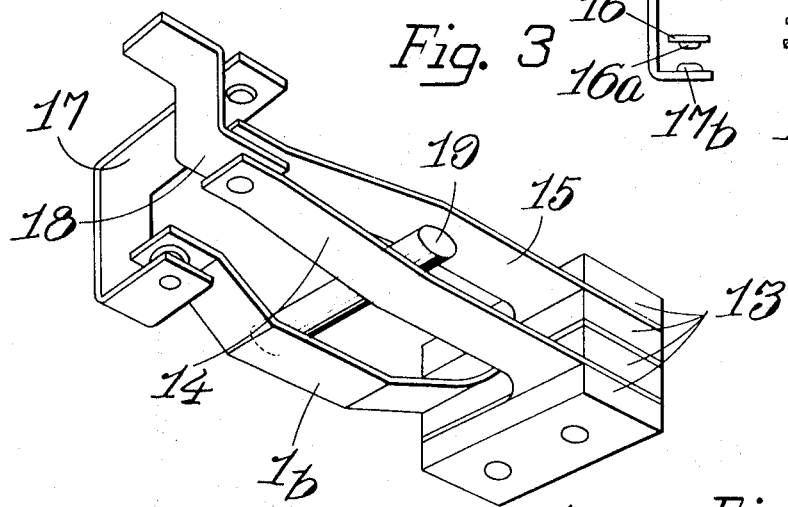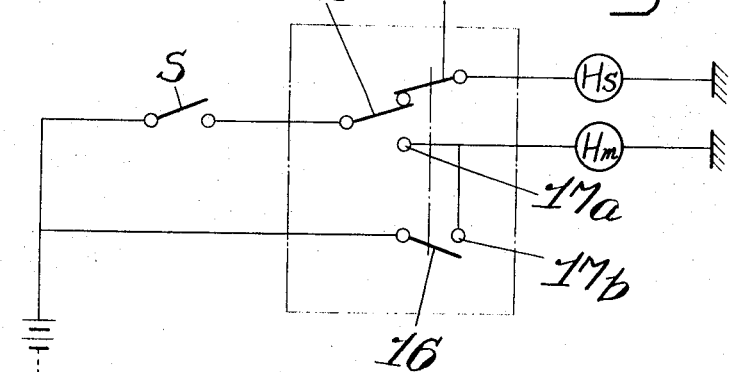

VEHICLE LIGHT CONTROL SYSTEM

The present invention relates to a combined or composite switch device including a dimmer switch which conducts energization or deenergization of main headlights and subheadlights of an automobile, and a flasher switch which energizes or deenergizes main headlights, in the daytime as well as in the nighttime, to provide flash signals when a car passes another car ahead.

The primal object of the present invention is to provide a combined or composite switch device which can be accommodated within the extremely narrow space such as a winker switch box, and assure expected switch operations precisely.

In the accompanying drawings showing a preferred embodiment of the present invention;

FIG. 3 is an enlarged perspective view of a substantial part;

FIGS. 4 through 6 are illustrations showing an operative relation among respective movable contacts; and FIG. 7 is a connection diagram.

Figure 1:
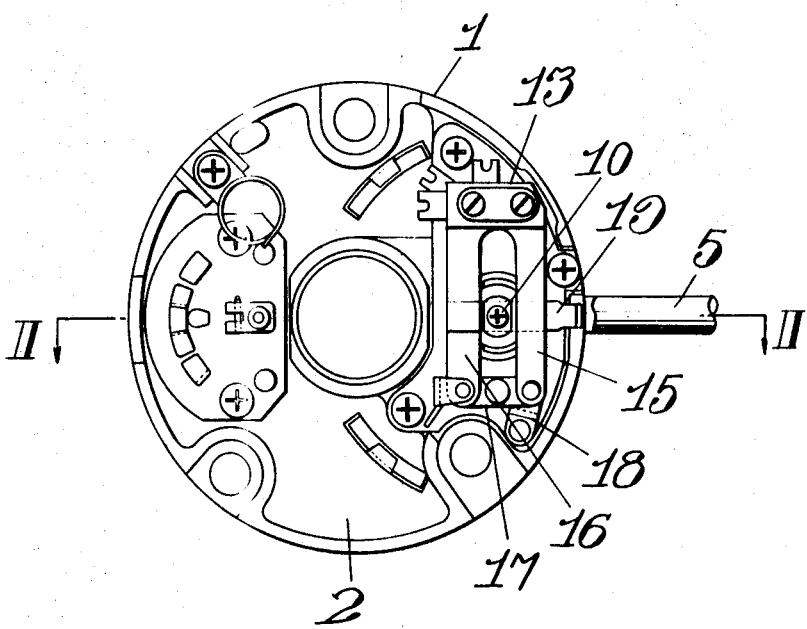
FIG. 1 is an explanatory plan view of FIG. 2, partly cut shown.

Referring to the accompanying drawings, numeral 1 is a winker switch box which has a bottom wall 2 provided with a bracket 3 for controlling a winker switch, through which an annular shaft 4 passes rotatably. A lever 5 extends outwardly of the winker switch box from the bracket 3 and is carried movably vertically by a transverse shaft 6. The bracket 3 has, at its end wall corresponding to an inner end of the lever 5, and upper dent and under dent 7, and a downwardly extending plane 8 contiguous to the under dent, with either of which a ball bearing 9 fitted at the inner end of said lever 5 is pushed into contact by a spring. Numeral 10 is a sliding member, which is idly fitted through the annular shaft 4 to extend downwardly with an upper end contacted with an undersurface of the inner part of the lever 5, and has a spring 11 attached thereto.

Numeral 12 is an insulating mount piece, to an underside of which below-mentioned movable conductive elements or pieces are fixed through several pieces of insulating spacers 13 piled one upon other. The movable resilient conductive element or piece 14 is connected with subheadlights, the movable resilient conductive element or piece 15 is connected with a potential source B, through a switch S for light Hs and Hm and the movable conductive element or piece 16 is connected with the potential source B. Each of these elements has one end inserted between separate spacers 13 in such manner that a pair of movable conductive elements or pieces 14 and 15 are spaced vertically, and another movable conductive element or piece 16 is arranged between said pair of movable conductive elements 14 and 15 and horizontally in parallel relation therewith. Numeral 18 is a dummy contact, which is placed between free ends of said pair of movable conductive elements 14 and 15, and through which a movable contact 14a of conductive element 14 is maintained normally in contact with a movable contact 15a of conductive element 15. Numeral 17 is a conductive element or piece of an inverted L-shape, which is connected with main headlights Hm and fixed to the underside of insulating mount plate 12. Said conductive element 17 has a fixed contact 17a at one end confronting with an upper face of said movable contact 15a and a fixed contact 17b at other end confronting with an under face of movable contact 16a. Numeral 19 is an operating member with a linear shape extending radially of the sliding member 10 to pass through an under portion thereof. The movable conductive elements with one end of each element inserted between different spacers 13 are attached to the insulating mount plate 12 mounted to the undersurface of bottom wall 2 of the winker switch box in a manner of permitting the sliding member 10 to pass through a central portion of the mount plate 12 and further to extend its under end through a space between a pair of movable conductive elements 14, 15 and another movable conductive element 16 arranged in horizontally parallel relationship with said pair of elements, so as to locate the operating member 19 transversely of and upon the movable conductive elements 14 and 16.

Figure 2:
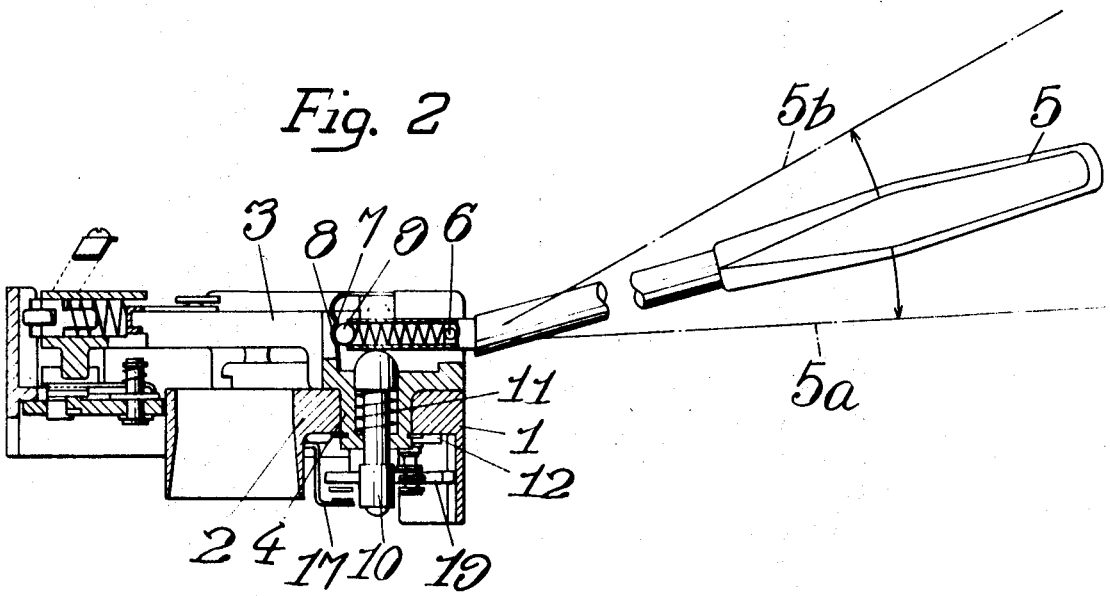
FIG. 2 is an explanatory side elevational view taken along the line II—II of FIG. 1.

The sliding member 10 is permitted a vertically sliding motion to cause a movement of movable conductive elements according to the movement of the lever 5. In detail, if the lever stands at the neutral position as shown in the solid line in FIG. 2, the sliding member 10 is maintained at the neutral position to retain the linear operating member 19 out of contact with any of movable conductive elements; if the lever 5 is moved downwardly to a position 5a from the neutral position, the sliding member 10 is moved upwardly to push the movable conductive element 15 upwardly; and if the lever 5 is moved upwardly to a position 5b the sliding member 10 is slid downwardly to press the movable conductive elements 14 and 16 downwardly.

FIG. 7 shows a connection diagram of a composite or combined switch of the present invention.

Operation of this embodiment will be described with reference to FIG. 7.

When the operating member 19 is maintained in the neutral position, and the switch S for headlights is turned to the ON position, the electric circuit of subheadlights Hs is closed by the movable contacts 14a and 15a normally in closed relation with one another, thereby energizing the subheadlights (see FIG. 4). When the operating member 19 is moved upwardly, due to swinging movement of lever 5 into position, the movable conductive element 15 is moved upwardly to bring the movable contact 15a into contact with the fixed contact 17a (FIG. 5), so that the electric circuit of main headlights Hm is closed, thereby energizing the main headlights Hm (see FIG. 5) and deenergizing the subheadlights Hs. The switchover operation of movable contacts as described constitutes a dimmer switch section.

When the lever 5 is pushed into position 5b, the operating member 19 is moved downwardly to push the movable conductive elements 14 and 16 downwardly so that the movable contact 14a is released Hm. the movable contact 15a and at the same time, the movable contact 16a is brought into contact with the fixed contact 17b, (FIG. 6) thereby making a closed circuit with main headlights Hm to energize the same (FIG. 6). At this time, the lever 5 is manually retained in the upwardly moved position 5b, and resultantly the ball bearing 9 is slid downwardly along the downwardly extending plane 8 of the bracket 3. As soon as the lever 5 is released, the ball bearing 9 is pushed automatically back to the neutral position by action of the spring 11, so that the operating member 19 is returned to the initial neutral position, thereby deenergizing the main headlights Hm. *the It is obvious that repetitively moving the operating member 19 from its lowermost position (FIG. 6) to the initial neutral position (FIG. 4) and to the lowermost position will cause an incessant energization and deenergization of the main headlights Hm*, thereby providing flash signals when the driver wants to pass another car ahead. In this case, if the switch S for the headlights is maintained in the closed position, the subheadlights Hs are energized or deenergized exactly opposite in relation to deenergization or energization of main headlights Hm. This constitutes a flash switch section.

The present invention having such construction as described hereinabove, can attain the object to provide a combined or composite switch device consisting of a dimmer switch energizing or deenergizing the subheadlights in the nighttime, and a flash switch connecting the main headlights directly with the potential source, and effecting a continual connection or disconnection of its movable contacts to cause energization or deenergization of the main headlights Hm both in the daytime and in the nighttime. The combined or composite switch of the present invention has such advantages that due to compact arrangement of respective elements including a pair of movable conductive pieces or elements 14 and 15 spaced vertically from each other and another conductive piece or element 16 arranged in horizontally parallel relation with said pair of conductive elements 14, 15, the fixed contact 17a arranged above the movable conductive element 15 and in confronting with the movable contact 15a thereof, the fixed contact 17b arranged above the movable conductive element 16 and in confronting with the movable contact 16a thereof, and the operating member movable vertically and located above the movable conductive elements 14 and 16, the entire height of the combined switch is reduced to be flattened so that the switch device can be accommodated within the narrower flat winker switch box, and such compact arrangement of respective elements permits the switch device to be operated precisely by moving the lever vertically in three positions.

What is claimed is:

1. A vehicle light control system, comprising:

a potential source;

first circuitry means having first light means associated therewith and a first resilient and movable conductive element connected in series with said first light means, said first conductive element having a first contact thereon;

second circuitry means connected to said potential source and including a switch connected in series with a second resilient and movable conductive element, said second conductive element having a second contact thereon, said first and second conductive elements being normally resiliently urged toward a closed position wherein said first and second contacts are normally maintained in conductive relationship whereby said first light means is energized whenever such switch is closed;

third circuitry means connected to said potential source in parallel relation to said second circuitry means and including a third resilient and movable conductive element disposed adjacent but spaced from said first and second conductive elements, said third conductive element having a third contact thereon normally maintained in an open position;

fourth circuitry means adapted to be selectively interconnected to either said second circuitry means or said third circuitry means, said fourth circuitry means including second light means connected in series with fixed contact means, said fixed contact means being adapted to be engaged with either said second contact or said third contact;

actuating means for permitting said fourth circuitry means to be selectively connected in series with either said second circuitry means or said third circuitry means, said actuating means including an operating member disposed for engagement with said first, second and third conductive elements, said operating member being normally maintained in a neutral position wherein said first and second conductive elements are maintained in said closed position and said third conductive element is maintained out of engagement with said fixed contact means;

said actuating means and said operating member being movable from said neutral position into first and second positions disposed on opposite sides of said neutral position, movement of said operating member to said first position causing said second conductive element to be moved away from said closed position and said second contact to be brought into engagement with said fixed contact means for causing energization of said second light means whenever said switch is closed, and movement of said operating member to said second position causing movement of both said first and third conductive elements whereby said first contact is moved away from said closed position to deenergize said first circuitry means and said third contact is moved into engagement with said fixed contact means for causing energization of said second light means;

resilient means coacting with said actuating means for resiliently urging said operating member toward said neutral position whenever said operating member is moved to said second position, whereby said operating member is automatically returned to said neutral position from said second position whenever the external actuating force is released; and means coacting with said actuating means for permitting said operating member to be releasably maintained in either said neutral position or said first position.

2. A switch assembly, comprising;

a first resilient and movable conductive element having a first contact thereon;

a second resilient and movable conductive element spaced from and substantially parallel with said first conductive element and having a second contact thereon, said first and second conductive elements being normally resiliently urged toward a closed position wherein said first and second contacts are maintained in conductive relationship;

a third resilient and movable conductive element spaced from and substantially parallel with said first and second conductive elements, said second and third conductive elements being laterally spaced from said first conductive element in substantially transverse directions, and said third conductive element having a third contact thereon;

a fixed conductive element having a fourth contact disposed for engagement with said second contact when said second conductive element is moved away from said closed position, and said fixed conductive element having a fifth contact disposed for engagement with said third contact, said third contact being normally maintained out of engagement with said fifth contact;

actuating means for causing selected movement of at least one of said movable conductive elements, said actuating means including an operating member disposed in the space between said movable conductive elements and normally maintained in a neutral position wherein said first and second conductive elements are maintained in said closed position and said third conductive element is maintained out of engagement with said fifth contact;

said actuating means and said operating member being movable from said neutral position into first and second positions disposed on opposite sides of said neutral position, movement of said operating member to said first position causing said second conductive element to be moved away from said closed position and said second contact to be brought into engagement with said fourth contact, and movement of said operating member to said second position causing movement of both said first and third conductive elements whereby said first contact is moved away from said closed position and said third contact is moved into engagement with said fifth contact;

resilient means coacting with said actuating means for resiliently urging said operating member toward said neutral position whenever said operating member is moved to said second position, whereby said operating member is automatically returned to said neutral position from said second position whenever the external actuating force is released; and detent means coacting with said actuating means for permitting said actuating means and said operating member to be releasably maintained in either said neutral position or said first position.

3. A switch assembly according to claim 2, including a sixth dummy contact disposed between and for engagement with said first and second contacts when said first and second conductive elements are in said closed position.

4. A switch assembly according to claim 2, wherein said actuating means includes a manually swingable lever and a slide member disposed adjacent and normally maintained in engagement with said lever by said resilient means, said slide member being mounted for slidable movement in a direction substantially parallel with the direction of movement of said movable conductive elements, and said operating member being fixedly secured to said slide member for simultaneous movement therewith.

5. A switch assembly according to claim 4, wherein said detent means coacts directly with said lever.

6. A switch assembly according to claim 2, wherein each said movable conductive element comprises an elongated leaflike resilient element having a contact portion thereon.